(12) United States Patent
Ahmed et al.

(10) Patent No.: US 11,989,918 B2
(45) Date of Patent: May 21, 2024

(54) SWIZZLE MODE DETECTION

(71) Applicants: Advanced Micro Devices, Inc., Santa Clara, CA (US); ATI Technologies ULC, Markham (CA)

(72) Inventors: Nooruddin Ahmed, Markham (CA); Anthony Chan, Markham (CA); Christopher J. Brennan, Boxborough, MA (US)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 613 days.

(21) Appl. No.: 17/132,612

(22) Filed: Dec. 23, 2020

(65) Prior Publication Data

US 2022/0101560 A1 Mar. 31, 2022

Related U.S. Application Data

(60) Provisional application No. 63/083,672, filed on Sep. 25, 2020.

(51) Int. Cl.
| | |
|---|---|
| *G06T 9/00* | (2006.01) |
| *G06F 7/24* | (2006.01) |
| *G06T 1/20* | (2006.01) |
| *G06T 3/40* | (2006.01) |

(52) U.S. Cl.
CPC .................. *G06T 9/00* (2013.01); *G06F 7/24* (2013.01); *G06T 1/20* (2013.01); *G06T 3/40* (2013.01); *G06F 2212/401* (2013.01)

(58) Field of Classification Search
CPC ..... G06T 9/00; G06T 1/20; G06T 3/40; G06F 7/24; G06F 2212/401; H04N 19/593
See application file for complete search history.

(56) References Cited

U.S. PATENT DOCUMENTS

| | | | |
|---|---|---|---|
| 6,868,186 B1 | 3/2005 | Sadeh | |
| 10,062,143 B2 | 8/2018 | Brennan et al. | |
| 10,510,185 B2 | 12/2019 | Saleh et al. | |
| 10,529,118 B1 * | 1/2020 | Wu | G06T 15/005 |

OTHER PUBLICATIONS

Seiler et al., "Automatic GPU Data Compression and Address Swizzling for CPUs via Modified Virtual Address Translation", I3D '20: Symposium on Interactive 3D Graphics and Games, May 2020, 10 pages.

* cited by examiner

*Primary Examiner* — William A Beutel
(74) *Attorney, Agent, or Firm* — Kowert, Hood, Munyon, Rankin & Goetzel, P.C.; Rory D. Rankin

(57) ABSTRACT

Systems, apparatuses, and methods for converting pixel data to a custom swizzle mode are disclosed. A graphics engine receives data in a pre-defined swizzle mode. The graphics engine determines a custom swizzle mode for the data that has directionality aligned to the data itself to further optimize deltas that are used for compressing the data. The graphics engine groups incoming data into group of two neighboring pixels in both the horizontal and vertical directions. The graphics engine scores horizontal and vertical groupings against each other to make a first swizzle mode bit selection. Then the graphics engine increases the grouping of pixels to include additional pixels and scores the increased groupings against each other to make subsequent swizzle mode bit selections. The data is reswizzled into the custom swizzle mode and provided to a compressor to be compressed.

20 Claims, 9 Drawing Sheets

Direction Encoding Table 700

| Encoding | Direction |
|---|---|
| 00 | Horizontal — 710 |
| 01 | Vertical — 715 |
| 10 | Diagonal — 720 |

Depth Encoding Table 730

| Encoding | Depth |
|---|---|
| 00 | 1 Pixel — 740 |
| 01 | 2 Pixels — 745 |
| 10 | 4 Pixels — 750 |
| 11 | 8 Pixels — 755 |

*FIG. 7*

SWIZZLE MODE DETECTION

CROSS REFERENCE TO RELATED APPLICATIONS

This application claims priority to Provisional Patent Application Ser. No. 63/083,672, entitled "SWIZZLE MODE DETECTION", filed Sep. 25, 2020, the entirety of which is incorporated herein by reference.

BACKGROUND

Description of the Related Art

Graphics engines are often used within computer graphics processing systems to create computer-generated imagery from a geometric model. A geometric model defines various objects, details, lighting sources, and other elements of a virtual scene. The graphics engine determines how to render a given scene based on the geometric model and other inputs from a software application. These inputs include graphical objects such as points, lines, polygons, three dimensional solid objects, and other objects.

A graphics engine receives source graphics data from many sources. The source graphics data can be surfaces, textures, and the like. This source graphics data is used by the graphics engine to render a given scene. In some cases, the graphics engine receives unformatted source graphics data where the format of the graphics data is unknown or where the format of the graphics data is arranged according to a pre-defined swizzle mode. Unformatted data (i.e., type-less data) refers to data formats where data organization is undefined or unknown. When the graphics data is arranged according to a pre-defined swizzle mode, the graphics engine can have difficulty using and/or compressing the graphics data.

BRIEF DESCRIPTION OF THE DRAWINGS

The advantages of the methods and mechanisms described herein may be better understood by referring to the following description in conjunction with the accompanying drawings, in which:

FIG. 7 illustrates custom swizzle mode encoding tables in accordance with one implementation.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Systems, apparatuses, and methods for converting pixel data to a custom swizzle mode are disclosed. In one implementation, a graphics engine receives data in a pre-defined swizzle mode. The graphics engine determines a custom swizzle mode for the data that has directionality aligned to the data itself to further optimize deltas that are used for compressing the data. The graphics engine groups incoming data into groups of two neighboring pixels in both the horizontal and vertical directions. The graphics engine scores horizontal and vertical groupings against each other to make a first swizzle mode bit selection. Then the graphics engine increases the grouping of pixels to include additional pixels and scores the increased groupings against each other to make subsequent swizzle mode bit selections. The data is reswizzled into the custom swizzle mode and provided to a compressor to be compressed.

Figure 1:
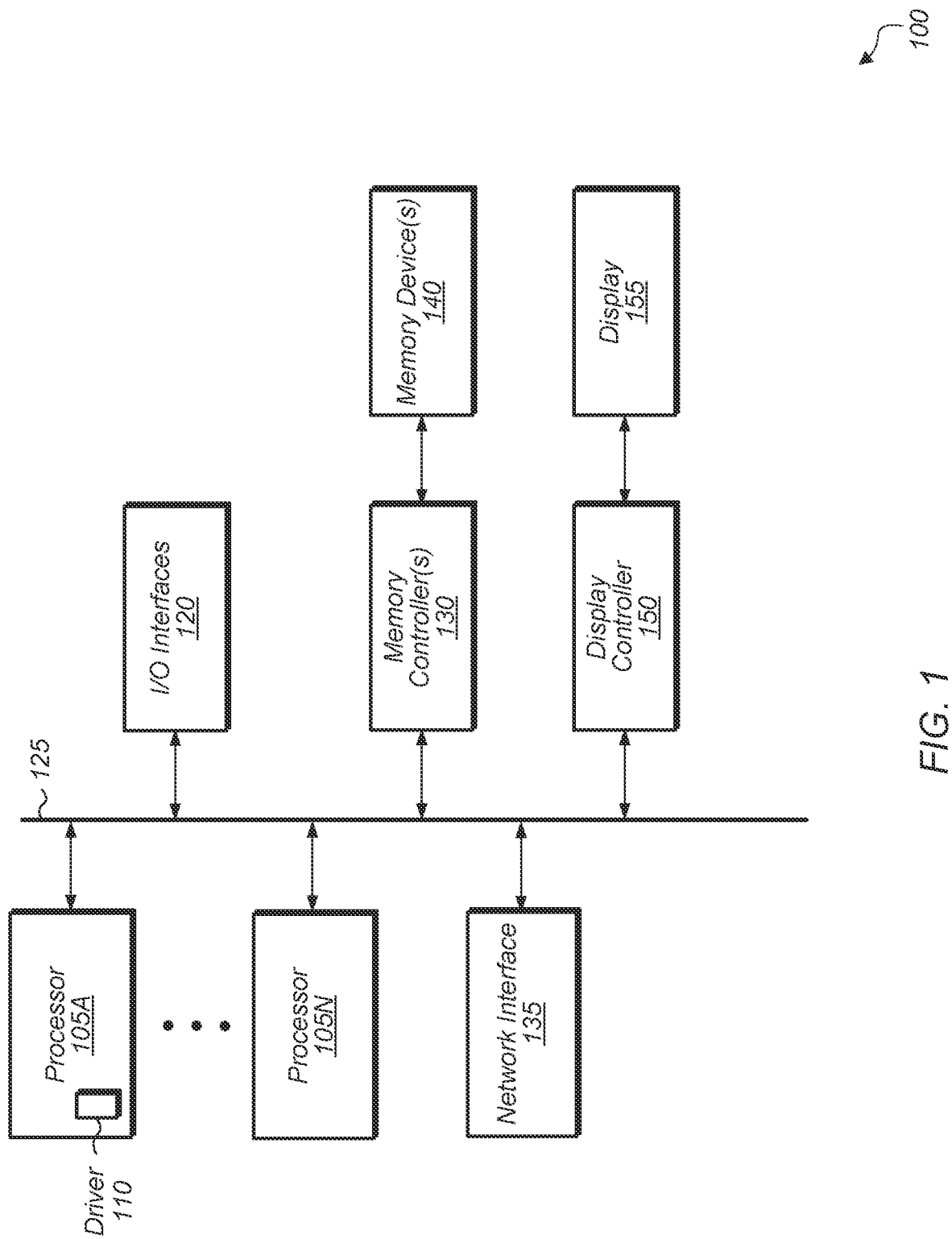
FIG. 1 is a block diagram of one implementation of a computing system.

Referring now to FIG. 1, a block diagram of one implementation of a computing system 100 is shown. In one implementation, computing system 100 includes at least processors 105A-N, input/output (I/O) interfaces 120, bus 125, memory controller(s) 130, network interface 135, memory device(s) 140, display controller 150, and display 155. In other implementations, computing system 100 includes other components and/or computing system 100 is arranged differently. Processors 105A-N are representative of any number of processors which are included in system 100.

In one implementation, processor 105A is a general purpose processor, such as a central processing unit (CPU). In this implementation, processor 105A executes a driver 110 (e.g., graphics driver) for communicating with and/or controlling the operation of one or more of the other processors in system 100. It is noted that depending on the implementation, driver 110 can be implemented using any suitable combination of hardware, software, and/or firmware. In one implementation, processor 105N is a data parallel processor with a highly parallel architecture. Data parallel processors include graphics processing units (GPUs), digital signal processors (DSPs), field programmable gate arrays (FPGAs), application specific integrated circuits (ASICs), and so forth. In some implementations, processors 105A-N include multiple data parallel processors. In one implementation, processor 105N is a GPU which provides pixels to display controller 150 to be driven to display 155.

Memory controller(s) 130 are representative of any number and type of memory controllers accessible by processors 105A-N. While memory controller(s) 130 are shown as being separate from processor 105A-N, it should be understood that this merely represents one possible implementation. In other implementations, a memory controller 130 can be embedded within one or more of processors 105A-N and/or a memory controller 130 can be located on the same semiconductor die as one or more of processors 105A-N. Memory controller(s) 130 are coupled to any number and type of memory devices(s) 140. Memory device(s) 140 are representative of any number and type of memory devices. For example, the type of memory in memory device(s) 140 includes Dynamic Random Access Memory (DRAM), Static Random Access Memory (SRAM), NAND Flash memory, NOR flash memory, Ferroelectric Random Access Memory (FeRAM), or others.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, network interface cards, and so forth. Network interface 135 is able to receive and send network messages across a network.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
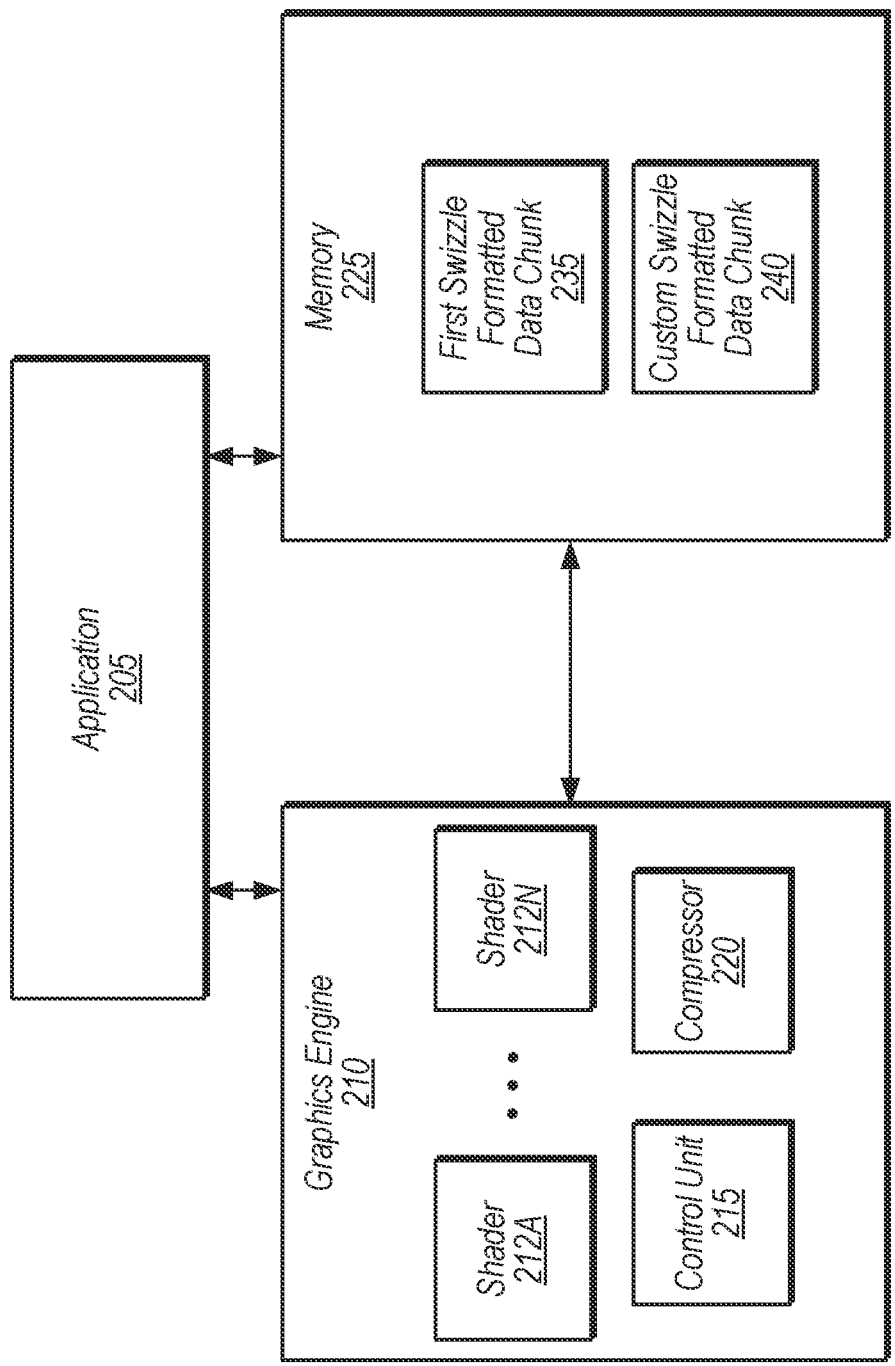
FIG. 2 is a logical block diagram of one implementation of a system for rendering graphics.

Turning now to FIG. 2, a logical block diagram of one implementation of a system 200 for rendering graphics is shown. In one implementation, system 200 includes components such as graphics engine 210, application 205, and memory 225. Graphics engine 210 includes at least shaders 212A-N, control unit 215, and compressor 220. Shaders 212A-N are representative of any number and type of shaders (e.g., geometry shader, light shader, pixel shader). Graphics engine 210 can be implemented using at least a portion of one or more CPUs, GPUs, FPGAs, ASICs, DSPs, and/or other processing resources. It is noted that system 200 can also include any number and type of other components, with the other components varying from implementation to implementation. In one implementation, application 205 is a graphics application for rendering pixels to represent scenes of a video game, movie, or other application. In one implementation, application 205 includes program instructions which are stored in memory 225 and which execute on graphics engine 210. Application 205 can run on a general-purpose processor or on fixed hardware such as a FPGA or ASIC. Similarly, shaders 212A-N can be implemented using any suitable combination of software and/or hardware.

In one implementation, graphics engine 210 processes first swizzle formatted data chunk 235 while performing rendering associated with a game, video, or compute sequence. As used herein, the term "data chunk" is defined as a collection of data. The collection of data can be referenced using a pointer, a buffer, or otherwise. The size of a data chunk can vary according to the implementation.

In one implementation, graphics engine 210 attempts to find a different swizzle mode for compressing first swizzle formatted data chunk 235. In this scenario, graphics engine 210 performs various operations to analyze the data of first swizzle formatted data chunk 235 to determine a custom swizzle mode that will achieve a higher compression ratio. As part of the analysis, in one implementation, graphics engine 210 generates shifted versions of first swizzle formatted data chunk 235 and then graphics engine 210 measures the correlation of these shifted versions with the original first swizzle formatted data chunk 235. For example, in one implementation, first swizzle formatted data chunk 235 is shifted by one byte to create a first shifted version, first swizzle formatted data chunk 235 is shifted by two bytes to create a second shifted version, and so on.

For each shifted version, a correlation between the shifted version and the original first swizzle formatted data chunk 235 is measured. For example, in one implementation, a bitwise XOR operation is performed between each shifted version and the original first swizzle formatted data chunk 235. The resultant output is stored for each bitwise XOR operation. In one implementation, the resultant output with the lowest number of 1 bits is deemed to be the closest correlation between shifted versions and the first swizzle formatted data chunk 235. The shifted version that is deemed the closest correlation is then used to create the custom swizzle formatted data chunk 240. These techniques will be described in more detail throughout the remainder of this disclosure.

After measuring the correlation between the shifted versions and first swizzle formatted data chunk 235, graphics engine 210 determines an optimal swizzle mode for compressing first swizzle formatted data chunk 235. Examples of techniques for determining the optimal swizzle mode will be described in further detail throughout the remainder of this disclosure. Next, graphics engine 210 reswizzles the first swizzle formatted data chunk 235 to create custom swizzle formatted data chunk 240. The custom swizzle formatted data chunk 240 is then provided to compressor 220 to be compressed. In one implementation, control unit 215 provides an identification of the custom swizzle mode to compressor 220. Compressor 220 then uses this custom swizzle mode when compressing custom swizzle formatted data chunk 240.

Figure 3:
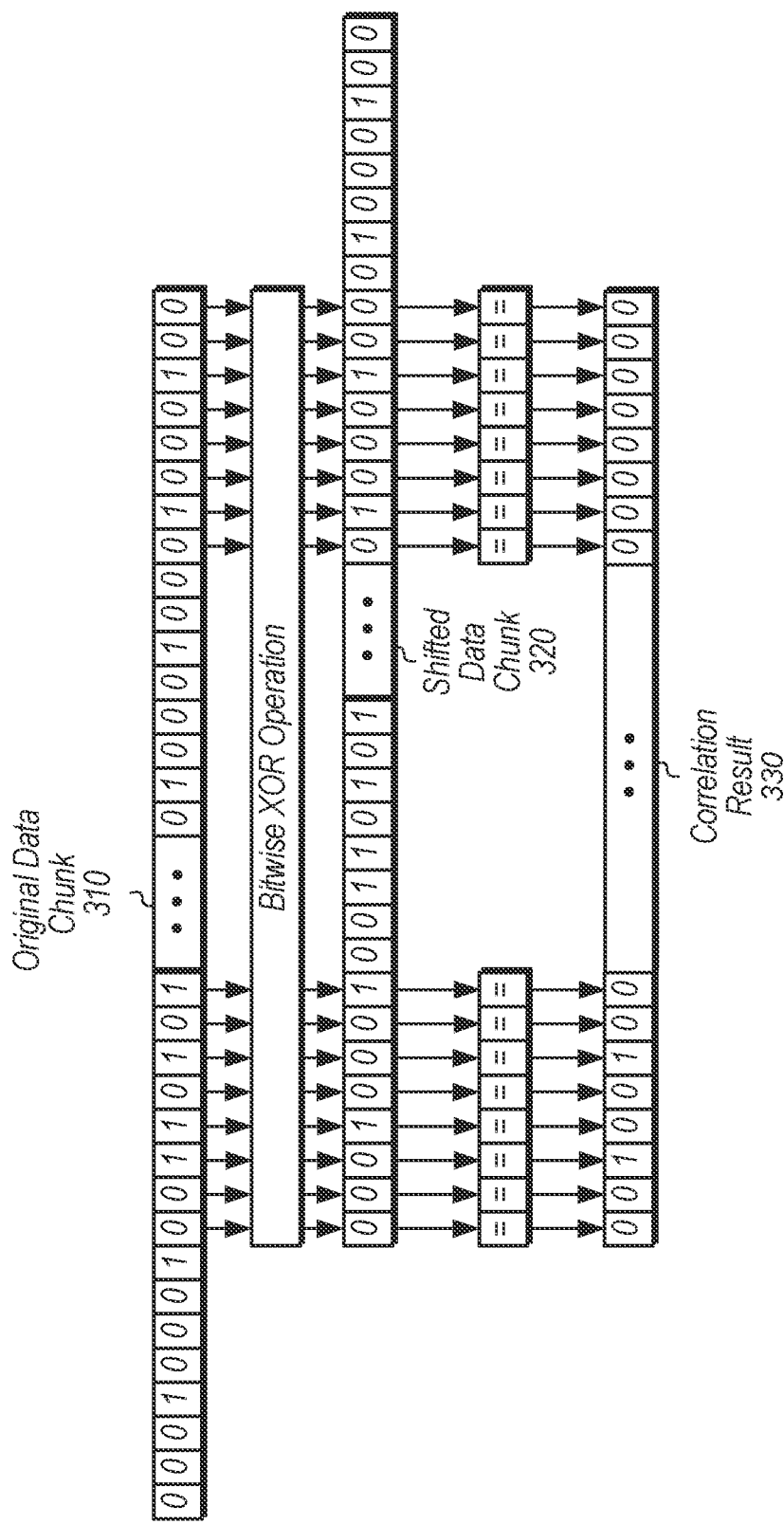
FIG. 3 is a diagram of one implementation of a data folding operation.

Referring now to FIG. 3, a diagram of one implementation of a data folding operation 300 is shown. Original data chunk 310 is representative of a data chunk in which the data chunk is stored in predefined swizzle mode. While original data chunk 310 represents a data chunk of any size, the first two bytes and the last two bytes of original data chunk 310 are shown in FIG. 3 to illustrate the data folding operation 300.

Data folding operation 300 illustrates the folding (i.e., shifting) of original data chunk 310 by one byte. In other words, shifted data chunk 320 represents original data chunk 310 shifted by one byte. In one implementation, a bitwise XOR operation is performed between original data chunk 310 and shifted data chunk 320 to generate correlation result 330. However, in other implementations, other types of transform operations can be performed between the original and shifted data chunks to generate a correlation result. After generating correlation result 330, the graphics engine will compare correlation result 330 to the other correlation results between other shifted versions and original data chunk 310. For example, the other shifted versions can include a 2-byte shifted version, a 3-byte shifted version, a 4-byte shifted version, and so on. It is noted that other shifts can be performed that are not in byte increments, such that a 10-bit shifted version, a 12-bit shifted version, a 14-bit shifted version, and so on can be tested.

When comparing correlation results, any type of comparison can be used to select the correlation with the "highest score". For example, in one implementation, the "highest score" is the correlation result with the lowest number of "1" bits. In other implementations, other ways of comparing the correlation results can be used to determine which correlation result has the "highest score" or "best score".

Figure 4:
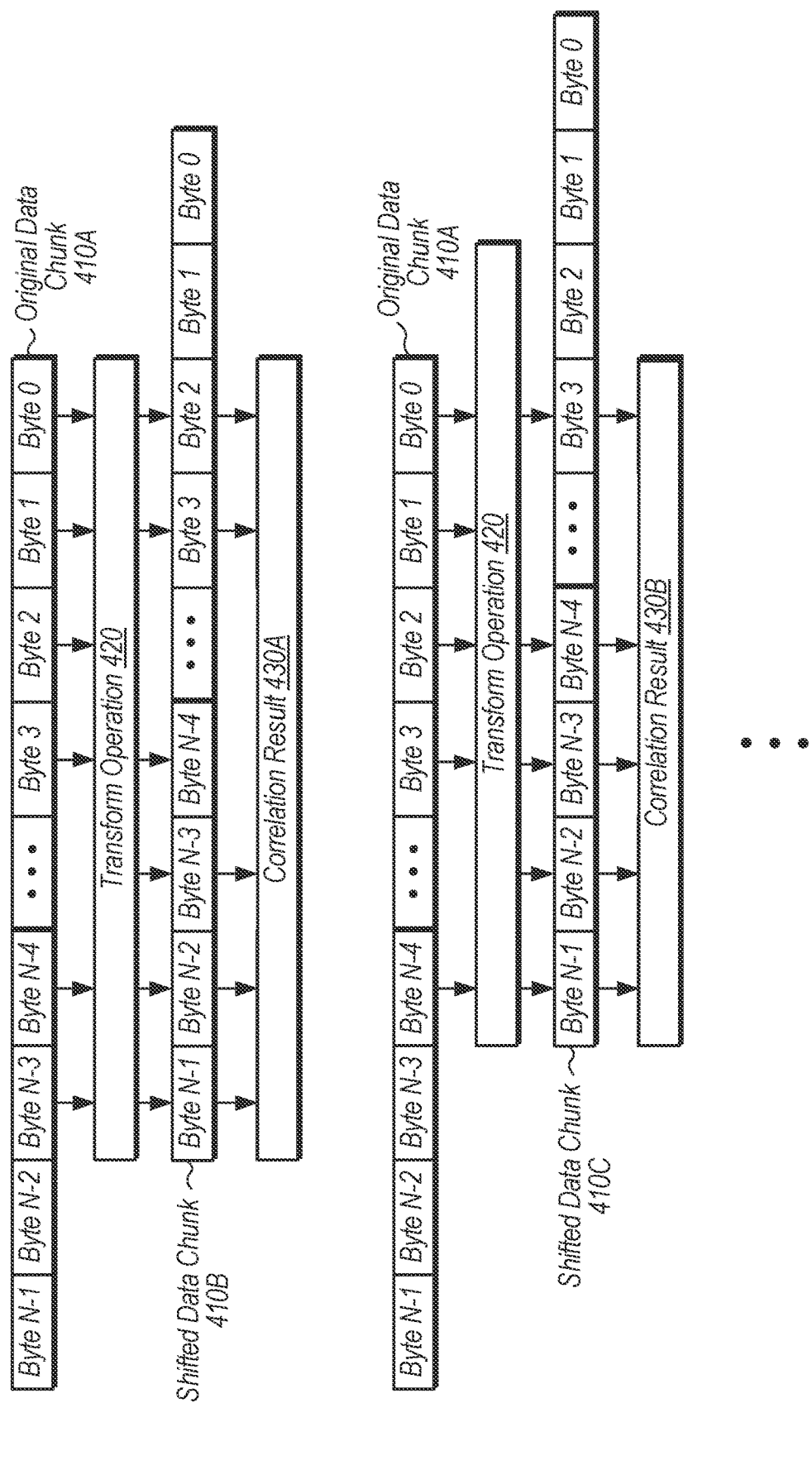
FIG. 4 is a diagram of one implementation of generating correlation results for different shifts of a data chunk.

Turning now to FIG. 4, a diagram of one implementation of generating correlation results for different shifts of a data chunk is shown. In one implementation, a graphics engine (e.g., graphics engine 210 of FIG. 2) receives original data chunk 410A which has a pre-defined swizzle format. Original data chunk 410A has any number of bytes N, with N varying according to the size of each different data chunk processed by the graphics engine. In order to determine a custom swizzle mode for original data chunk 410, the graphics engine performs multiple different shifts of original data chunk 410A while capturing the correlation results of each shift. Examples of two different correlation results 430A-B are shown in FIG. 4. The graphics engine can perform any number of shifts and generate any number of correlation results, with the number varying according to the implementation.

As shown at the top of FIG. 4, shifted data chunk 410B is shifted by two bytes from the original data chunk 410A. A transform operation 420 is applied between original data chunk 410A and shifted data chunk 410B. Because of the shift, the transform operation 420 will be applied between byte 0 of original data chunk 410A and byte 2 of shifted data chunk 410B, between byte 1 of original data chunk 410A and byte 3 of shifted data chunk 410B, and so on up to byte N−3 of original data chunk 410A and byte N−1 of shifted data chunk 410B.

In one implementation, transform operation 420 is an XOR operation. Other types of transform operations can be used in other implementations. After performing transform operation 420 between original data chunk 410A and shifted data chunk 410B, correlation result 430A is generated. The graphics engine performs a similar transform operation 420 between original data chunk 410A and shifted data chunk 410C to generate correlation results 430B, as shown at the bottom of FIG. 4. Shifted data chunk 410C is created by shifting original data chunk 410A by three bytes. The graphics engine can create any number of different shifted data chunks by shifting original data chunk 410A by different amounts. The graphics engine will create a different correlation result for each different shifted data chunk. After all of the correlation results are generated, the graphics engine will select the correlation result with the highest score. The graphics engine will then generate a custom swizzle format for original data chunk 410A according to the specific format that generated the correlation result with the highest score.

Figure 5:
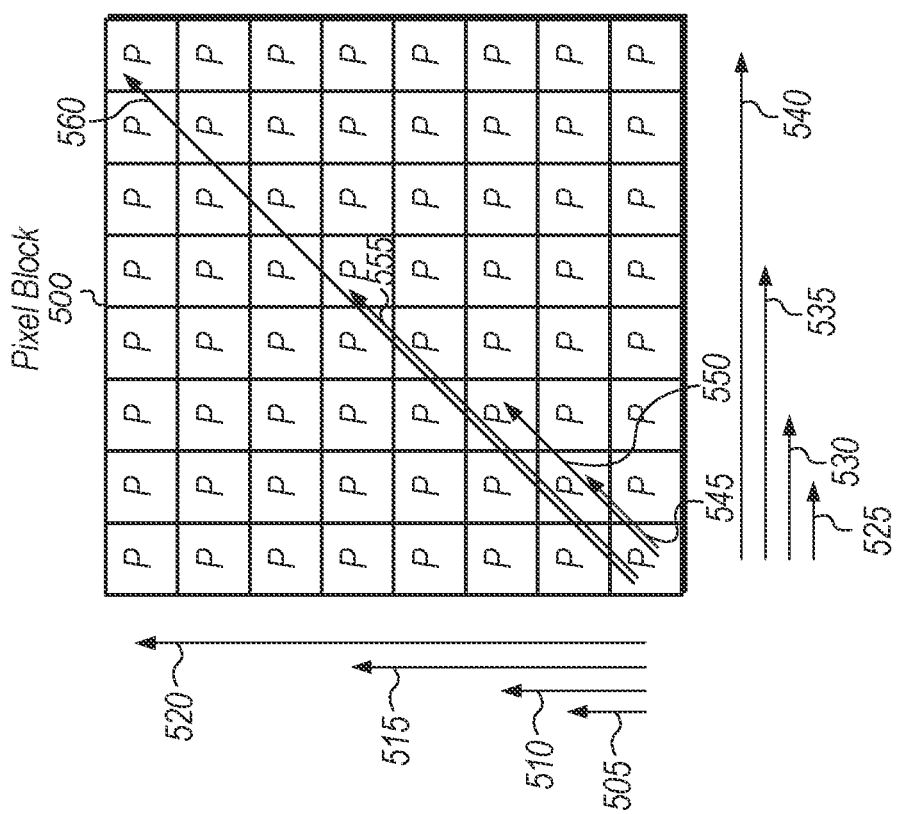
FIG. 5 illustrates a block of pixels and gradient vectors in accordance with one implementation.

Referring now to FIG. 5, a diagram of one implementation of a block of pixels and gradient vectors is shown. Pixel block 500 represents the pixel values of a given 8×8 block of pixels of a surface. The surface can have any size and include any number of 8×8 pixel blocks. For pixel block 500, a graphics engine (e.g., graphics engine 210 of FIG. 2) folds pixel data over using different directions and distances to find the optimal swizzle mode that achieves the highest compression ratio. For example, in one implementation, the graphics engine starts with folding data over in the vertical direction between adjacent neighbors as shown with arrow 505. In one implementation, the graphics engine performs a bitwise-XOR operation between vertical neighboring pixels to determine the difference (i.e., delta) between the pixels. The graphics engine records the scores (i.e., correlation) between the adjacent vertical pixels. Next, the graphics engine calculates the correlation between pixels that are two pixels away in the vertical direction as represented by arrow 510. The graphics engine records the scores between these vertical pixels that are two pixels apart. The graphics engine continues with this process for four pixels and eight pixels in the vertical direction as represented by arrows 515 and 520.

Additionally, the graphics engine records scores between pixels in the horizontal direction for the distances represented by arrows 525, 530, 535, and 540. This is similar to the process that was performed for the different pixel distances in the vertical direction. Also, the graphics engine records scores between pixels in the diagonal direction for the distances represented by arrows 545, 550, 555, and 560. Likewise, this is similar to the process that was performed for the different pixel distances in the vertical and horizontal directions. After the scores have been recorded for the different directions and distances, the graphics engine selects the custom swizzle mode that corresponds to the best score of all of the scores that were calculated. The graphics engine then provides the pixel block 500 to a compressor (i.e., codec) while specifying the custom swizzle mode that corresponds to the best score. The compressor compresses pixel block 500 using the specified custom swizzle mode, and an indication (i.e., encoding) of this custom swizzle mode is included in a header which is appended to the compressed block.

While the example of pixel block 500 being an 8×8 block of pixels is shown in FIG. 5, it should be understood that this is merely representative of one particular implementation. In other implementations, other sizes of pixel blocks other than 8×8 pixels can be compressed using the techniques described herein.

Figure 6:
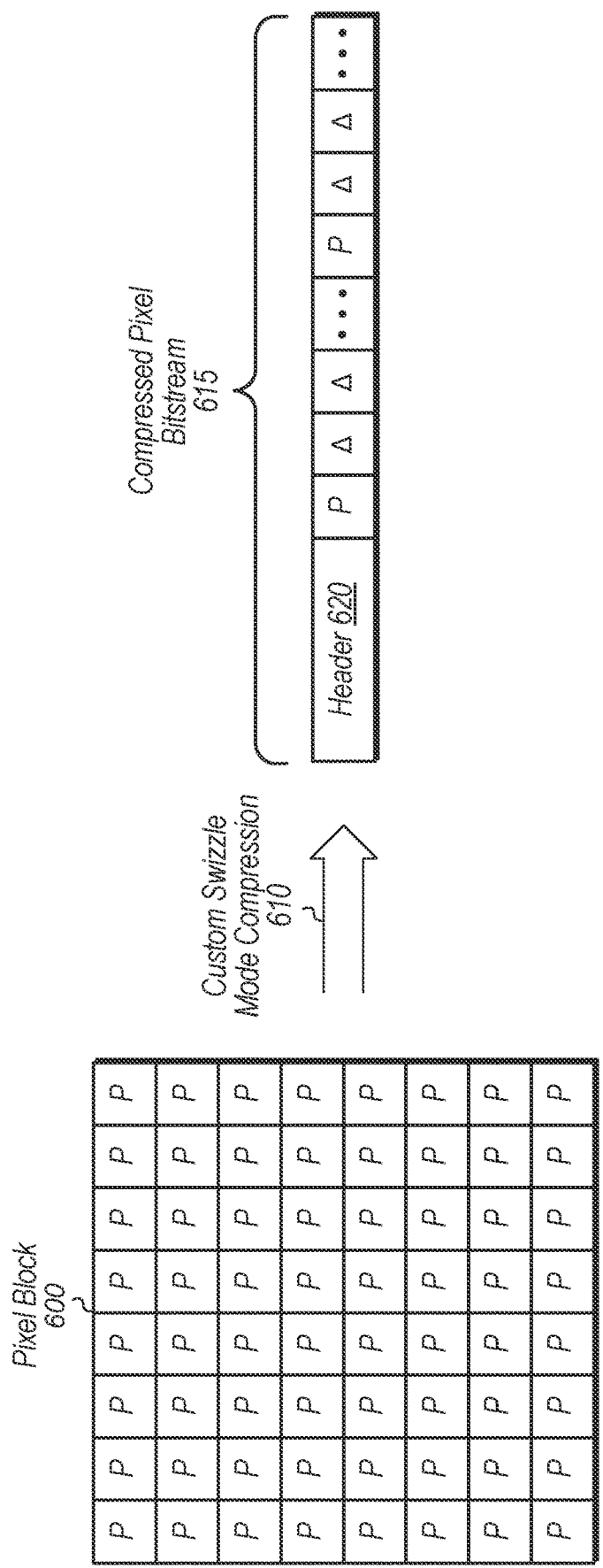
FIG. 6 is a diagram of compressing a pixel block in accordance with one implementation.

Turning now to FIG. 6, a diagram of one implementation of compressing a pixel block 600 is shown. In one implementation, a graphics engine (e.g., graphics engine 210 of FIG. 2) receives a chunk of uncompressed data. In one implementation, the uncompressed data is a surface for use by a graphics rendering application. The uncompressed data can be any size with any number of pixel blocks. Pixel block 600 is representative of one such pixel block from the uncompressed data. The uncompressed data can include any number of other pixel blocks, depending on the size of the uncompressed data chunk.

In one implementation, the graphics engine analyzes pixel block 600 to determine a custom swizzle mode for compressing pixel block 600. In one implementation, the graphics engine performs folding operations to fold pixels from different locations in pixel block 600 against neighbors in the horizontal, vertical, and diagonal directions. The graphics engine generates scores for the different directions and different pixel distances to measure the correlation between the pixels of pixel block 600. Then, the graphics engine selects the custom swizzle mode that corresponds to the best score among the plurality of scores that were generated to measure the correlation for the different directions and pixel distances. The arrow 610 represents the custom swizzle mode compression selection being performed. The resultant compressed pixel bitstream 615 generated by the compressor includes header 620 followed by the compressed pixel data. The compressed pixel data includes original pixel values followed by difference (or delta) values for one or more subsequent pixel values.

Turning now to FIG. 7, custom swizzle mode encoding tables 700 and 730 in accordance with one implementation are shown. After a graphics engine analyzes a pixel block (e.g., pixel block 500 of FIG. 5), the graphics engine determines the optimal custom swizzle mode for compressing the pixel block. After the pixel block is compressed based on the optimal custom swizzle mode, the graphics engine generates an encoding for specifying the custom swizzle mode that was used for compression. This encoding allows a decompressor to know how to decompress the compressed block.

For example, in one implementation, two bits are used to encode the swizzle direction as shown in direction encoding table 700. In this implementation, "00" is used to encode a horizontal swizzle direction as shown in entry 710, "01" is used to encode a vertical swizzle direction as shown in entry 715, and "10" is used to encode a diagonal swizzle direction as shown in entry 720. Similarly, in one implementation, two bits are used to encode the swizzle depth as shown in depth encoding table 730. Entry 740 includes the encoding "00" which is used for a depth of one pixel, entry 745 includes the encoding "01" which is used for a depth of two pixels, entry 750 includes the encoding "10" which is used for a depth of four pixels, and entry 755 includes the encoding "11" which is used for a depth of eight pixels. In other implementations, other encodings can be used to encode the direction and/or the depth of the custom swizzle mode. In one implementation, the encodings for direction and depth are combined in a header which is appended to the pixel block.

Figure 8:
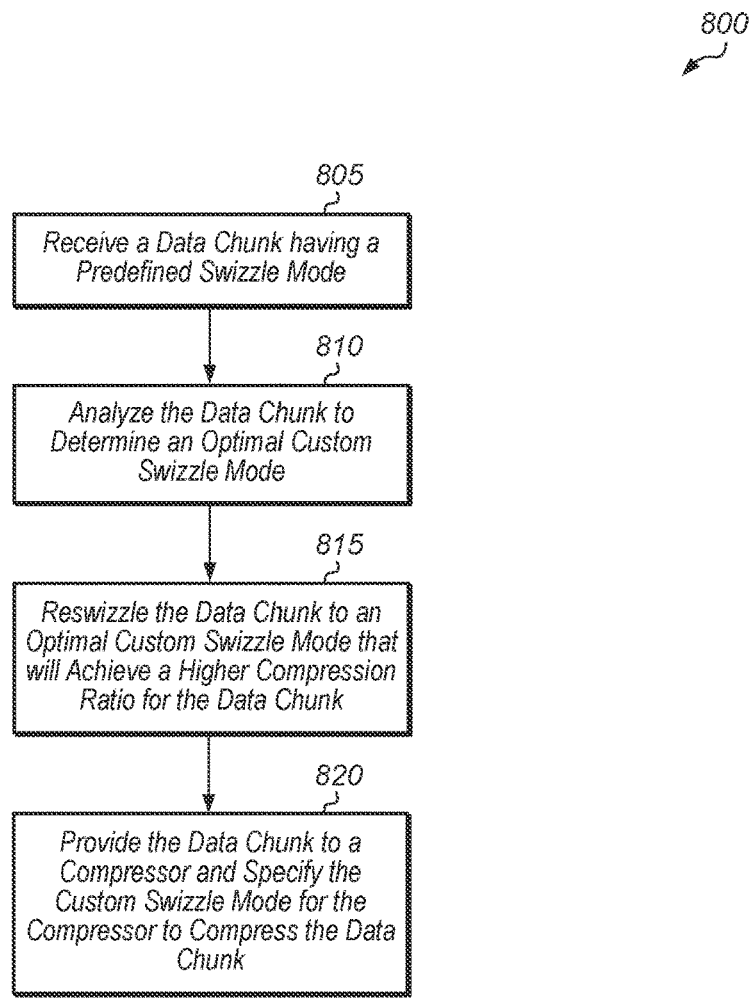
FIG. 8 is a generalized flow diagram illustrating one implementation of a method for detecting a swizzle mode of data.
Figure 9:
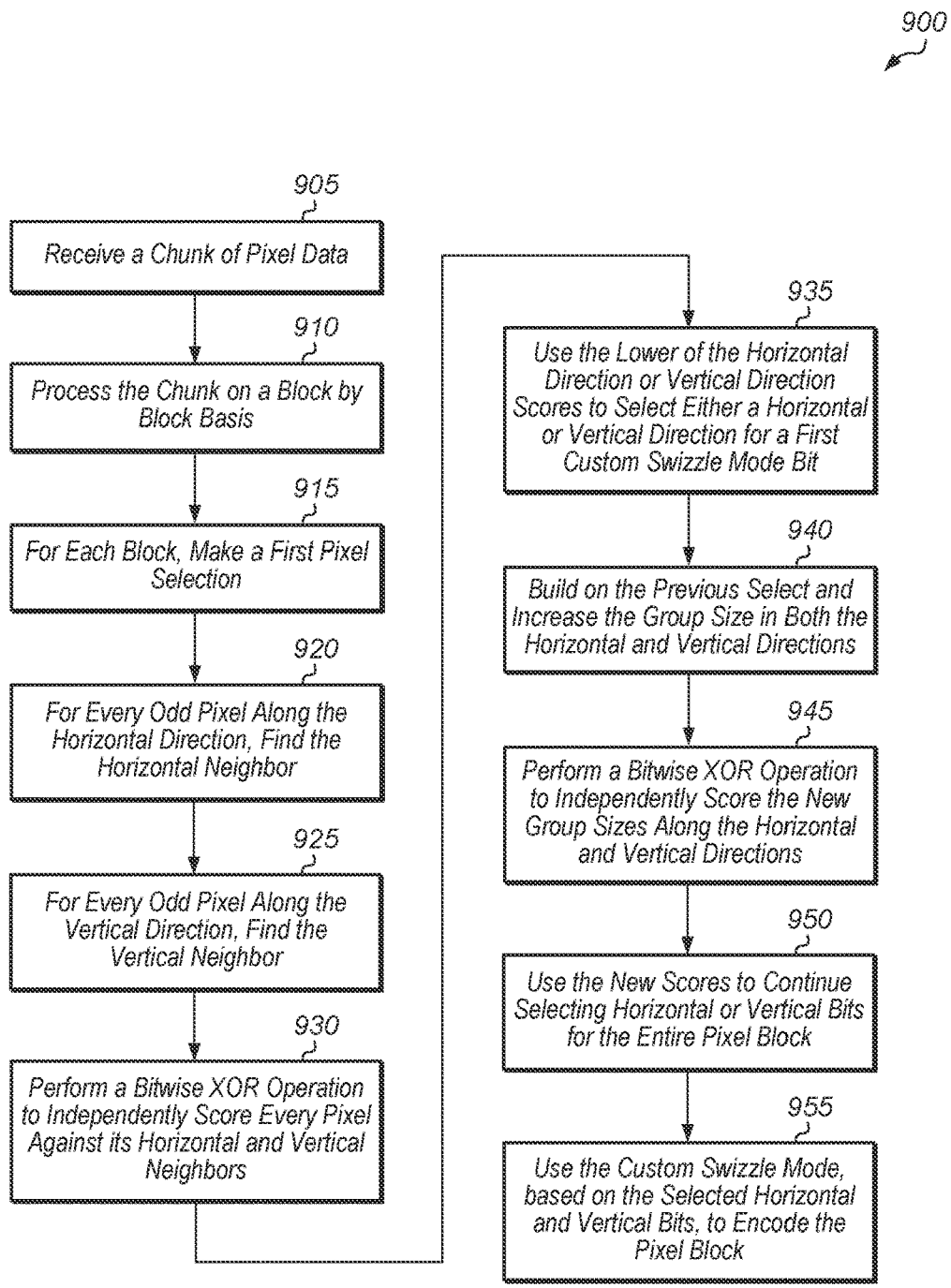
FIG. 9 is a generalized flow diagram illustrating one implementation of a method for reswizzling source pixel data.

Turning now to FIG. 8, one implementation of a method 800 for detecting a swizzle mode of data is shown. For purposes of discussion, the steps in this implementation and those of FIG. 9 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 800.

A graphics engine receives a data chunk having a pre-defined swizzle mode (block 805). In response to receiving the data chunk, the graphics engine analyzes the data chunk to determine an optimal custom swizzle mode (block 810). Next, the graphics engine reswizzles the data chunk to an optimal custom swizzle mode that will achieve a higher compression ratio for the data chunk (block 815). As used herein, the term "reswizzle" is defined as changing the swizzle mode of a block of pixel data. The graphics engine then provides the data chunk to a compressor (e.g., compressor 220 of FIG. 2) and specifies the custom swizzle mode for the compressor to compress the data chunk (block 820). After block 820, method 800 ends.

Referring now to FIG. 9, one implementation of a method 900 for reswizzling source pixel data is shown. A graphics engine receives a chunk of pixel data (block 905). The pixel data can have one of a plurality of pre-defined swizzle modes. The graphics engine processes the chunk on a block by block basis (block 910). The size of a block of pixel data (e.g., 8×8 pixel block) can vary according to the implementation. For each block of pixel data, the graphics engine makes a first pixel selection (block 915). Next, for every odd pixel along the horizontal direction, the graphics engine finds the horizontal neighbor (block 920). For every odd pixel along the vertical direction, the graphics engine finds the vertical neighbor (block 925). The graphics engine performs a bitwise XOR operation to independently score every pixel against its horizontal and vertical neighbors (block 930). The graphics engine uses the lower of the horizontal direction or vertical direction scores to select either a horizontal or vertical direction for a first custom swizzle mode bit (block 935).

Next, the graphics engine builds on the previous selection and increases the group size in both the horizontal and vertical directions (block 940). The graphics engine independently scores the new group sizes by performing a bitwise XOR operation along the horizontal and vertical directions (block 945). The graphics engine uses the new scores to continue selecting horizontal or vertical bits for the entire pixel block (block 950). The custom swizzle mode, based on the selected horizontal and vertical pixels, is then used to encode the pixel block (block 955). After block 955, method 900 ends.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
   a memory device storing a data chunk having a pre-defined swizzle mode; and
   a graphics engine comprising circuitry configured to:
      generate, for a first pixel of a first block of the data chunk, a first score to measure a correlation between the first pixel and a horizontal neighboring pixel;
      generate, for the first pixel of the first block of the data chunk, a second score to measure a correlation between the first pixel and a vertical neighboring pixel; and
      select, from the first and second scores, a lower score corresponding to a higher correlation;
      encode a first bit of a first custom swizzle mode for the first block based on the lower score; and
      encode an indication of the first custom swizzle mode for the first block based on the first bit.

2. The apparatus as recited in claim 1, wherein the graphics engine is configured to:
   encode additional bits of the first custom swizzle mode by generating additional scores in multiple directions for multiple pixel distances; and
   encode the indication of the first custom swizzle mode for the first block based on the additional bits.

3. The apparatus as recited in claim 2, wherein the graphics engine is configured to provide the indication of the first custom swizzle mode to a compressor.

4. An apparatus as recited in claim 3, wherein the compressor is configured to compress the first block based on the first custom swizzle mode.

5. An apparatus as recited in claim 4, wherein the compressor is configured to compress each subsequent block of the data chunk using a custom swizzle mode corresponding to each subsequent block.

6. An apparatus as recited in claim 5, wherein the compressor is further configured to compress a second block using a second custom swizzle mode different from the first custom swizzle mode.

7. The apparatus as recited in claim 1, wherein the graphics engine is further configured to:
generate, for the first pixel of the first block of the data chunk, a third score to measure a correlation between the first pixel and a diagonal neighboring pixel; and
select, from the first, second, and third scores, a lowest score corresponding to a higher correlation.

8. A method comprising:
generating, for a first pixel of a first block of a data chunk having a pre-defined swizzle mode, a first score to measure a correlation between the first pixel and a horizontal neighboring pixel;
generating, for the first pixel of the first block of the data chunk, a second score to measure a correlation between the first pixel and a vertical neighboring pixel; and
selecting, from the first and second scores, a lower score corresponding to a higher correlation;
encoding a first bit of a first custom swizzle mode for the first block based on the lower score; and
encoding an indication of the first custom swizzle mode for the first block based on the first bit.

9. The method as recited in claim 8, further comprising:
encoding additional bits of the first custom swizzle mode by generating additional scores in multiple directions for multiple pixel distances; and
encoding the indication of the first custom swizzle mode for the first block based on the additional bits.

10. The method as recited in claim 9, further comprising providing the indication of the first custom swizzle mode to a compressor.

11. The method as recited in claim 10, further comprising compressing, by the compressor, the first block based on the first custom swizzle mode.

12. The method as recited in claim 11, further comprising compressing each subsequent block of the data chunk using a custom swizzle mode corresponding to each subsequent block.

13. The method as recited in claim 12, further comprising compressing a second block using a second custom swizzle mode different from the first custom swizzle mode.

14. The method as recited in claim 8, further comprising:
generating, for the first pixel of the first block of the data chunk, a third score to measure a correlation between the first pixel and a diagonal neighboring pixel; and
selecting, from the first, second, and third scores, a lowest score corresponding to a higher correlation.

15. A system comprising:
a memory device storing a data chunk having a pre-defined swizzle mode; and
a graphics engine comprising circuitry configured to:
generate, for a first pixel of a first block of a data chunk having a pre-defined swizzle mode, a first score to measure a correlation between the first pixel and a horizontal neighboring pixel;
generate, for the first pixel of the first block of the data chunk, a second score to measure a correlation between the first pixel and a vertical neighboring pixel;
select, from the first and second scores, a lower score corresponding to a higher correlation;
encode a first bit of a first custom swizzle mode for the first block based on the lower score;
encode an indication of the first custom swizzle mode for the first block based on the first bit; and
a compressor configured to compress the first block based on the first custom swizzle mode.

16. The system as recited in claim 15, wherein the graphics engine is further configured to:
encode additional bits of the first custom swizzle mode by generating additional scores in multiple directions for multiple pixel distances; and
encode the indication of the first custom swizzle mode for the first block based on the additional bits.

17. The system as recited in claim 16, wherein the graphics engine is configured to provide the indication of the first custom swizzle mode to a compressor.

18. The system as recited in claim 17, wherein the compressor is further configured to compress each subsequent block of the data chunk using a custom swizzle mode corresponding to each subsequent block.

19. The system as recited in claim 15, wherein the compressor is further configured to compress a second block using a second custom swizzle mode different from the first custom swizzle mode.

20. The system as recited in claim 15, wherein the graphics engine is further configured to:
generate, for the first pixel of the first block of the data chunk, a third score to measure a correlation between the first pixel and a diagonal neighboring pixel; and
select, from the first, second, and third scores, a lowest score corresponding to a higher correlation.

\* \* \* \* \*